United States Patent [19]
Tang et al.

[11] Patent Number: 5,422,457
[45] Date of Patent: Jun. 6, 1995

[54] SOLDERING IRON WITH QUICK CHANGE HEATER ASSEMBLY WITH STATIC DISSIPATIVE AND STRAIN RELIEVING RECEIVER FOR DETACHABLE POWER CORD-HEATER CONNECTIONS

[75] Inventors: Anthony Q. Tang, Ellicott City; E. Raleigh Hodil, Jr., Timonium; Louis A. Abbagnaro; William J. Siegel, both of Silver Spring; Charles Cardno, Ellicott City, all of Md.

[73] Assignee: Pace, Incorporated, Laurel, Md.

[21] Appl. No.: 137,473

[22] Filed: Oct. 18, 1993

[51] Int. Cl.⁶ .......................... H05B 1/00; H05B 3/42
[52] U.S. Cl. ...................... 219/238; 219/227
[58] Field of Search ........ 219/221, 225, 226, 227–241, 219/533

[56] References Cited

U.S. PATENT DOCUMENTS

| | | |
|---|---|---|
| 2,274,408 | 2/1942 | Hampton et al. ............... 219/229 |
| 4,086,465 | 4/1978 | Sylvester . |
| 4,431,903 | 2/1984 | Riccio . |
| 4,463,247 | 7/1984 | Lawrence et al. . |

FOREIGN PATENT DOCUMENTS

| | | | |
|---|---|---|---|
| 251271 | 1/1988 | European Pat. Off. ............ 219/238 |
| 2751518 | 5/1978 | Germany .............................. 219/236 |
| 1154437 | 6/1969 | United Kingdom ................. 219/229 |
| 2095149 | 9/1982 | United Kingdom ................. 219/237 |

*Primary Examiner*—John A. Jeffery
*Attorney, Agent, or Firm*—Sixbey, Friedman, Leedom & Ferguson; Gerald J. Ferguson, Jr.; David S. Safran

[57] ABSTRACT

A soldering iron including an insulator, a dissipator, and a hollow, cylindrical handle through which the electrical cable travels, and in which the wires, extending from the electrical cable and connected to the heater unit by individual plug and socket connectors, are able to move freely for making it easier to exchange the heating element but prevent the wires from being accidentally disconnected by pulling on the electrical cord during use. More specifically, a single electrical insulator body, which fits inside the dissipator, receives all of the electrical connectors. Furthermore, the insulator provides unidirectional strain relief by trapping the wires against an inside tapered portion of the dissipator when mounted within the dissipator and releases the wires in the opposite direction simply by the act of being removed from the dissipator. Furthermore, the electrical insulator together with a minimal contact area joining of the dissipator to the handle serves to achieve a cool handpiece while making it possible to limit the use of expensive, high temperature resistant, static dissipative materials to only the dissipator, it being suitable to use high temperature resistant plastics that are not static dissipative for the electrical insulator and low temperature resistant, static dissipative plastic for the handle.

11 Claims, 3 Drawing Sheets

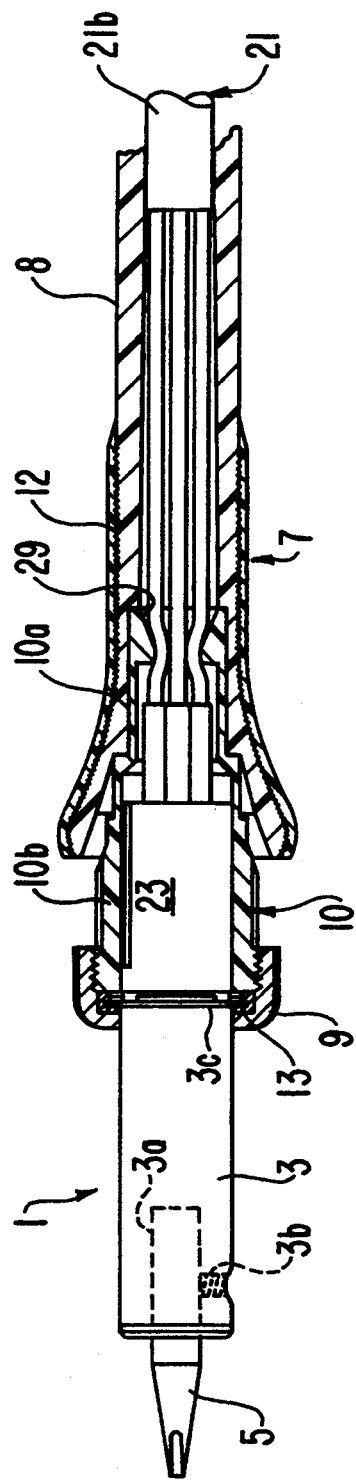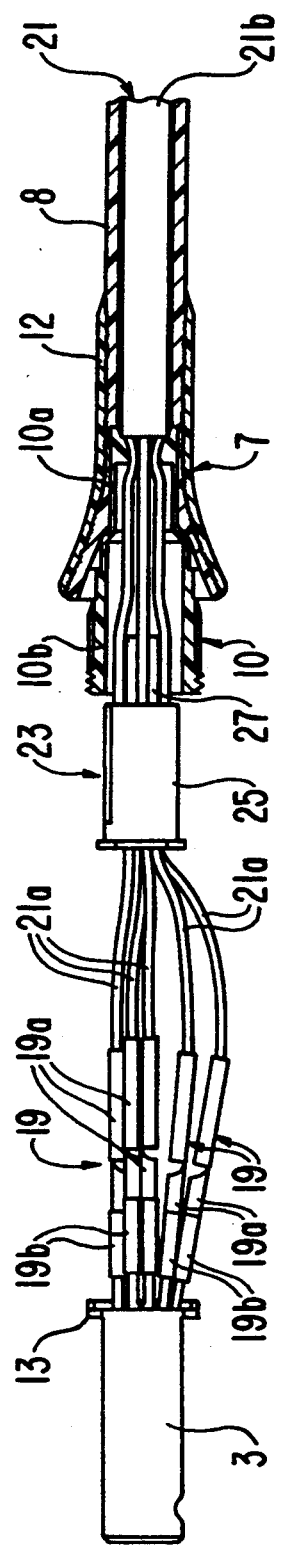

SOLDERING IRON WITH QUICK CHANGE HEATER ASSEMBLY WITH STATIC DISSIPATIVE AND STRAIN RELIEVING RECEIVER FOR DETACHABLE POWER CORD-HEATER CONNECTIONS

BACKGROUND OF THE INVENTION

1. Field of the Invention

The present invention relates to soldering irons, and in particular, to pen type soldering irons of the type having a heater assembly in which exchangeable soldering tips are mountable and which, itself, is replaceable. The invention is especially directed to such soldering irons as are used for performing soldering on printed circuit boards.

2. Description of Related Art

Typically, the heater assembly of a soldering iron of the type to which the present invention is directed has a heater assembly which includes an electrical heating element and a temperature sensor which are disposed within a tip-mounting housing. The electrical heating element and temperature sensor are electrically connected to a five wire electrical cable which runs through a handle portion of the soldering iron. For work on circuit boards sensitive to electrostatic discharge (ESD) damage, such soldering irons are generally required to have their exposed surfaces constructed of static dissipative material in order to minimize or eliminate the possibility of a potentially damaging static charge from building up thereon.

In the case of the Weller EC1503A soldering iron, sold by the Well Division of Cooper Industries, Cheraw, S.C., detachable electrical connections between exposed portions of the wires of the electrical cable and wires of the heater assembly are provided by plug and socket type, quick connect and disconnect, electrical connectors. To shield the electrical connections from each other to prevent shorting, a plastic tubing section is placed over each electrical connection. Furthermore, since the electrical cable passes through the handle with clearance (to permit the cable to move freely therethrough whenever the heater unit is pulled forward to provide access to the electrical connections or the electrical connections are pushed into the handle assembly when the heater assembly is mounted on the handle) to provide strain relief and to prevent an unintended disconnection of one of the electrical wires due to the electrical cable being pulled or otherwise subjected to tension forces rearwardly of the handle, an inner end portion of the electrical cable has clip members attached thereon. These clip members engage directly in clip-receiving apertures formed in the body of the heater assembly so as to cause tensile forces applied to the cable to bypass the electrical connections wires and be transferred from the cable to the body of the heater assembly. However, such a construction is cumbersome to assemble and because the heater assembly mounts directly to the handle, the handle must be constructed of a high temperature resistant, static dissipative material, and such materials are relatively expensive in comparison to static dissipative materials which are not high temperature resistant and are especially so as compared to nondissipative materials.

In U.S. Pat. No. 4,463,247 to Lawrence et al., a soldering iron is disclosed in which the heater unit is provided with a light bulb type base, so that it can be connected and disconnected with the handle by being screwed into and out of a threaded electrical socket in the handle. However, such a light bulb type arrangement is impractical where more than two electrical connections need to be made.

Similarly, U.S. Pat. Nos. 4,086,465 (Sylvester) and 4,431,903 (Riccio) disclose soldering irons wherein the heater assembly is electrically connected and disconnected with an electrical cord fixed in the handle by dual prong-type contacts on the heater assembly being plugged into electrical sockets hard-wired onto the electrical cord. A similar arrangement, but having a three prong electrical connection, can be found in the Weller EC1201P soldering iron. The Sylvester and Riccio soldering irons have no temperature sensor and in the Weller EC1201P soldering iron, a temperature sensing probe is provided, but is separately soldered to the electrical cable and extends through the electrical connector of the handle into the heater assembly. However, this complicates assembly of the soldering iron and precludes replacement of the sensor as a unit with the heater assembly, and should it fail, the entire soldering iron must be taken apart to replace it. On the other hand, anchoring of the electrical cable in the handle of the soldering iron, in the manner used in any of these three prior art devices, would be unsuitable with an arrangement of the type used in the initially-mentioned Weller EC1503A soldering iron.

SUMMARY OF THE INVENTION

In view of the foregoing, it is an object of the present invention to provide a soldering iron with a quick change connection between wires for a heater unit and wires from a power cable in which strain relief for the connection is provided in a manner which facilitates assembly and disassembly of heater unit to the handle of the soldering iron without adversely affecting manufacturing or maintenance costs.

It is a further object of the invention to achieve the foregoing while, at the same time, eliminating the need for separate electrical insulator coverings for each of the electrical connectors, and minimizing the use of expensive, high temperature resistant, static dissipative materials.

Yet another object of the invention is to provide a smaller and more compact pen type soldering iron which will be cooler and more comfortable to use.

These objects and others are achieved, according to a preferred embodiment of the invention by providing a soldering iron including an insulator, a dissipator, and a hollow, cylindrical handle through which the electrical cable travels, and in which the wires, extending from the electrical cable and connected to the heater unit by individual plug and socket connectors, are able to move freely for making it easier to exchange the heating element but are prevented from being accidentally disconnected by pulling on the electrical cord during use. More specifically, a single electrical insulator body, which fits inside the dissipator, receives all of the electrical connectors. Furthermore, the insulator provides a unidirectional cable pull (away from heater assembly) strain relief by trapping the wires against an inside tapered portion of the dissipator when mounted within the dissipator and releasing the wires to move in the opposite direction (toward heater assembly) simply by the act of being removed from the dissipator.

Furthermore, the electrical insulator (together with a minimal contact area joining of the dissipator to the handle) also serves to achieve a cool handpiece while making it possible to limit the use of expensive, high temperature resistant, static dissipative materials to only the dissipator, it being suitable to use high temperature resistant plastics that are not static dissipative for the electrical insulator and low temperature resistant, static dissipative plastic for the handle.

These and further objects, features and advantages of the present invention will become apparent from the following description when taken in connection with the accompanying drawings which, for purposes of illustration only, show a single preferred embodiment in accordance with the present invention.

BRIEF DESCRIPTION OF THE DRAWINGS

FIG. 1 is a partial longitudinal sectional view of a preferred embodiment soldering iron in accordance with the invention;

FIG. 2 is a partial longitudinal sectional view of the soldering iron of FIG. 1 in a partially disassembled state;

DETAILED DESCRIPTION OF THE PREFERRED EMBODIMENT

Figure 3:
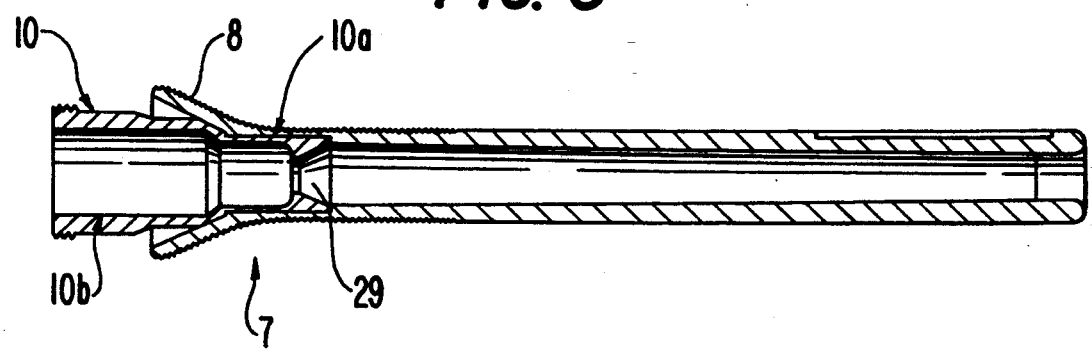
FIG. 3 is a cross-sectional view of the dissipator and handle of the soldering iron of FIGS. 1 & 2.

FIG. 1 shows a pen type soldering iron 1 of the type having a heater unit 3 in which a variety of different exchangeable soldering tips 5 are mountable and which, itself, is removably attached to a hollow elongated handle 7. A tip 5 is received in a tip receptacle 3a and is fixed therein by a set screw 3b as represented in broken lines, and the heater unit 3 is mounted to the end of handle 7 by a retaining nut 9 which holds a peripheral flange 3c of the heating unit against the front end of the handle 7 on which the nut 9 is threaded.

Handle 7 is formed of an elongated hand-grippable element 8 having a hollow interior and a tubular dissipator element 10 that has a reduced diameter mounting portion 10a that is fixed in an end portion of the hollow interior of the hand-grippable element 8 and has a receptacle portion 10b which projects axially from said hand-grippable element 8. Preferably, the hand-grippable element 8 has a removable elastic grip 12 applied over at least the front half thereof. An elastomeric ring 13 helps keep nut 9 from loosening due to thermal expansion and contraction of nut 9, tubular dissipator element 10 and heater unit 3, and provides some additional thermal barrier to the flow of heat from heater unit 3 into hand-grippable element 8.

Figure 4:
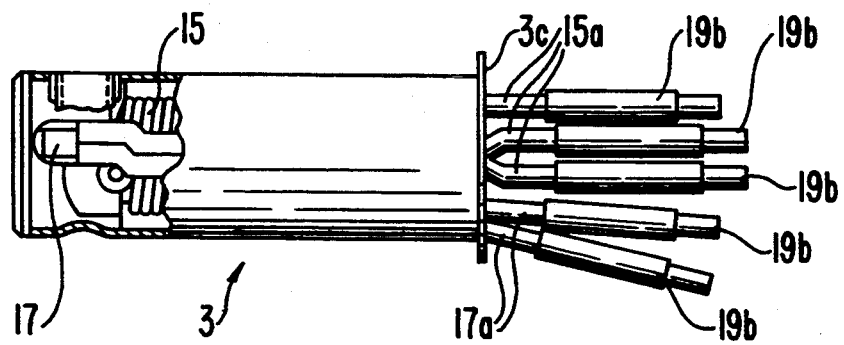
FIG. 4 is a partial cross-sectional view of the heater unit of the soldering iron of FIGS. 1 & 2.
Figure 5:
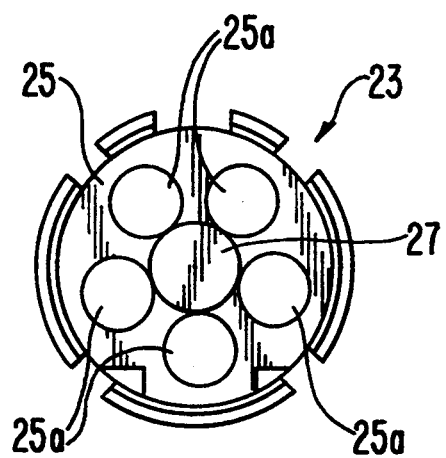
FIG. 5 is a rear end elevational view of the insulator of the soldering iron of FIGS. 1 & 2.
Figure 6:
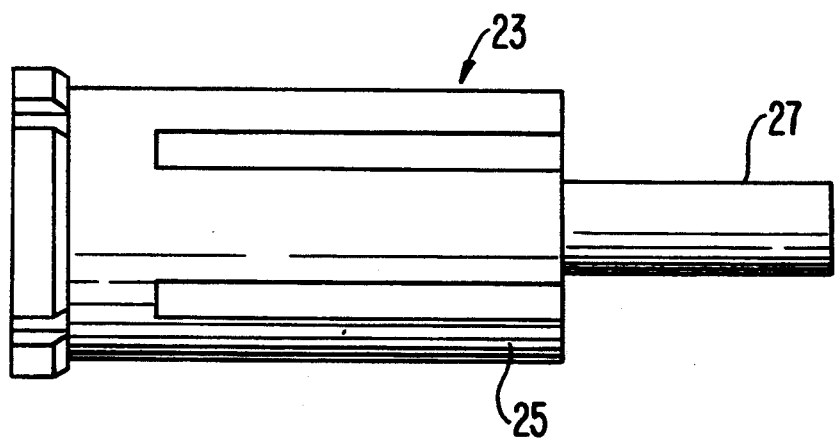
FIG. 6 is a side elevational view of the insulator of FIG. 5.

As shown in FIG. 4, the heater unit 3 has an electrical heating coil 15 for heating soldering tip 5 and a temperature sensor 17 for monitoring the temperature of the heater unit 3 in proximity to tip 5 and coil 15. Heating coil 15 has three electrical leads 15a and sensor 17 a pair of electrical leads 17a. Mounted on one end of each lead 15a, 17a is one half of a plug and socket type electrical connector 19, by which each of the electrical leads 15a, 17a, are detachably electrically connected to a respective wire 21a of an electric power cable 21 at end portions of the wires that have been exposed by removal of the corresponding portion of the outer jacket 21b of the power cable 21, as can be most clearly seen in FIG. 2. As illustrated, the plug parts 19a of the connectors 19 are crimped onto the leads 15a, 17a, and the socket parts 19b are crimped onto the wires 21a, but this relationship can be reversed.

To electrically insulate the electrical connections, formed by each of the electrical connectors 19, from each other, an insulator 23 is provided. Each of the wires 21a is passed through a respective axial passage 25a of the insulator body 25 prior to connecting parts 19a, 19b of the electrical connectors 19 together. The insulator body 25, and the passages 25a therethrough, is long enough so that the full length of electrical connectors 19 can be received within them when the soldering iron 1 is assembled as in FIG. 1.

For preventing disconnection of the electrical connections by separation of the detachable electrical connectors 19 as a result of tensile forces being applied to the power cable 21 during use, a unidirectional strain relief arrangement is provided. In particular, an aperture 29 (FIG. 3) is provided in the hollow handle 7 through which the end portions of the electrical wires 21a from which said surrounding jacket 21b has been removed extend. Preferably, the aperture 29 is formed in an inner end of the reduced diameter mounting portion 10a of the dissipator element 10 and tapers inwardly toward its receptacle portion 10b. The aperture 29 has a diameter that is less than the outer diameter of the surrounding jacket 21b of power cable 21 but is greater than the inner diameter thereof. The strain relief arrangement also includes a projection 27 on an inner end of the insulator body 25. The projection 27 is located centrally with respect to receiving passages 25a and has a diameter that when added to the diameters of the electrical wires 21a is greater than that of said aperture, i.e., a tangent circle about the wires 21a in an area they radially adjoin projection 27 is greater that the circumference of aperture 29 through which they must pass, so that the end portions of the electrical wires 21a are trapped between the projection 27 and the aperture 29 when the insulator body 25 is held in the receptacle portion 10b of the dissipator 10 of handle 8 by mounting of the heater unit 3 thereagainst via nut 9.

The aperture 29 tapers inwardly toward said receptacle portion to facilitate insertion of the portion of the wires 21a from which the jacket 21b has been removed through the aperture 29, which has a diameter that is smaller than that of the outer diameter of the jacket 21b to limit the extent to which handle 7 can slide rearwardly along the cable and which is greater than the inner diameter of the cable jacket 21b so that, when the projection 27 is not received within the collection of wires 21a due to removal of the insulator 23 from the dissipator 10, the wires 21a can pass freely through the aperture 29.

Since a primary use for an electric soldering iron according to the invention is for performing assembly, disassembly and repair operations on printed circuit boards, to prevent damage to sensitive electronic components, the handles of such soldering irons are conventionally made of static dissipative materials. However, as pointed out initially, high temperature resistant, static dissipative materials are relatively expensive in comparison to static dissipative materials which are not high temperature resistant and are especially so as compared to nondissipative materials. For this reason, the soldering iron in accordance with the present invention has been designed to minimized the usage of high temperature resistant, static dissipative materials. In particular, only the dissipator 10 and the nut 9 are formed of a static dissipative material that is resistant to solder-melting temperatures produced by the heater unit. The hand-grippable element 8 is formed of a static dissipative material that has a low temperature resistance in comparison to that of which the dissipator element is formed, this being possible due to the fact the insulator 23 (which can be made of non-static dissipative materials due to it being an internal component) also serves as a thermal insulator and because the receptacle portion 10b projects axial from hand-grippable element 8 so that the only direct heat transfer contact between the dissipator 10 and the hand-grippable element 8 is at mounting portion 10a which, preferably, is sonically welded to the hand-grippable element 8 only at a few points to minimize heat transfer due to the limited contact area.

By way of example, the dissipator element 10 can be formed of a commercially available polyphenylene sulfide material having carbon fibers therein, and insulator 23 can be formed of a commercially available natural polyphenylene sulfide material (i.e., without conductive fibers or particles therein). The hand-grippable element 8 can be formed of a thermoplastic polyester, such as a commercially available polybutylene terephthalate having carbon fibers therein. However, other materials which might be used for element 8 include an ABS or an amorphous nylon material alloyed with a conductive polymer.

While only a preferred embodiment in accordance with the present invention have been shown and described, it should be understood that the invention is not limited thereto, and is susceptible to numerous changes and modifications as will be apparent to those skilled in the art based on the foregoing description. Therefore, this invention should not be viewed as limited to the details shown and described herein, and includes all such changes and modifications as are encompassed by the scope of the claims appended hereto.

We claim:

1. An electric soldering iron comprising:
   A) a hollow elongated handle;
   B) a heater unit having receiving means for detachably receiving an exchangeable soldering tip element, electrical heating means for heating a soldering tip element received in the receiving means, and temperature sensing means for monitoring the temperature of the heater unit;
   C) an electric power cable having a plurality of individual electrical wires within a surrounding jacket;
   D) mounting means detachably mounting the heater unit to the handle;
   E) plug and socket type electrical connector means forming an individual detachable electrical connection between each a plurality of electrical leads of said heating means and of said sensing means and a respective electrical wire of said power cable at an end portion thereof from which said surrounding jacket has been removed;
   F) insulator means insulating said detachable electric connections with respect to each other; and
   G) strain relief means preventing disconnection of said detachable electrical connections upon application of tensile forces to said power cable;
   wherein said insulator means comprises an insulator body having a plurality of receiving passages, each of which receives a respective said electrical connection, and said insulator body being held in said handle by mounting of said heater unit to said handle by said mounting means; and wherein said strain relief means comprises an aperture provided in the hollow handle through which the end portions of the electrical wires from which said surrounding jacket has been removed extend, said aperture having a diameter that is less than an outer diameter of the surrounding jacket of said power cable and greater than an inner diameter thereof, and a projection on an inner end of said insulator body, said projection being located centrally with respect to said receiving passages and having a diameter in combination with the diameters of the end portions of the electrical wires from which said surrounding jacket has been removed which is greater than that of said aperture, so that said end portions of the electrical wires are trapped between said projection and said aperture when said insulator body is held in said handle by mounting of said heater unit to said handle.

2. An electric soldering iron according to claim 1, wherein said handle is comprised of an elongated hand-grippable element having a hollow interior and a tubular dissipator element, said dissipator element having a reduced diameter mounting portion that is fixed in an end portion of the hollow interior of the hand-grippable element and having a receptacle portion in which said insulator body is received, said receptacle portion projecting axial from said hand-grippable element.

3. An electric soldering iron according to claim 2, wherein said aperture is formed in an inner end of the reduced diameter mounting portion of the dissipator element.

4. An electric soldering iron according to claim 3, wherein said aperture tapers inwardly toward said receptacle portion.

5. An electric soldering iron according to claim 4, wherein said dissipator element is formed of a static dissipative material that is resistant to solder-melting temperatures produced by the heater unit and said hand-grippable element is formed of a static dissipative material that has a low temperature resistance in comparison to that of which the dissipator element is formed.

6. An electric soldering iron according to claim 2, wherein said dissipator element is formed of a static dissipative material that is resistant to solder-melting temperatures produced by the heater unit and said hand-grippable element is formed of a static dissipative material that has a low temperature resistance in comparison to that of which the dissipator element is formed.

7. An electric soldering iron according to claim 6, wherein said dissipator element is formed of a polyphenylene sulfide material.

8. An electric soldering iron according to claim 7, wherein said hand-grippable element is formed of a thermoplastic polyester.

9. An electric soldering iron according to claim 6, wherein said hand-grippable element is formed of a thermoplastic polyester.

10. An electric soldering iron according to claim 6, wherein said insulator body is formed of a nonstatic dissipative material that is resistant to solder-melting temperatures produced by the heater unit and is thermally insulative.

11. An electric soldering iron according to claim 2, wherein said insulator body is formed of a nonstatic dissipative material that is resistant to solder-melting temperatures produced by the heater unit and is thermally insulative.

* * * * *